United States Patent
McClure et al.

[15] 3,683,965
[45] Aug. 15, 1972

[54] ADJUSTABLE CHOKE VALVE

[72] Inventors: James H. McClure, Dallas; James W. McCrary, Richardson, both of Tex.

[73] Assignee: Materials Technology Corporation, Dallas, Tex.

[22] Filed: April 8, 1970

[21] Appl. No.: 26,698

[52] U.S. Cl..............................137/625.3, 251/368
[51] Int. Cl.............................F16k 11/02, F16k 3/08
[58] Field of Search.........137/625.3, 625.31, 625.32; 251/207, 208, 368

[56] References Cited

UNITED STATES PATENTS

| | | | |
|---|---|---|---|
| 3,207,181 | 9/1965 | Willis | 137/625.31 |
| 3,059,667 | 10/1962 | Coceano | 251/368 X |
| 2,208,394 | 7/1940 | Scherer | 251/368 X |
| 2,797,701 | 7/1957 | Nurkiewicz | 251/368 X |
| 3,463,192 | 8/1969 | Herion | 251/368 X |
| 2,100,366 | 11/1937 | Tyler | 137/625.31 |
| 3,331,396 | 7/1967 | Willis | 137/625.31 |

*Primary Examiner*—Henry T. Klinksiek
*Attorney*—Jack A. Kanz

[57] ABSTRACT

Disclosed is an adjustable choke valve having opposed abutting discs which have apertures passing therethrough for adjustably varying the flow of fluid through the valve as one disc is rotated with respect to the other. The opposed mating surfaces of the discs are covered with coatings of dense impermeable material having a hardness of at least 2,700 on the Knoop scale and are polished to provide an effective fluid seal therebetween. Also disclosed are methods for fabricating steel discs with titanium carbide coated graphite inserts in the opposed mating surfaces.

3 Claims, 4 Drawing Figures

Patented Aug. 15, 1972

3,683,965

INVENTORS
JAMES H. MC CLURE
JAMES W. MC CRARY

ATTORNEY

ADJUSTABLE CHOKE VALVE

This invention relates to valve assemblies and methods for fabrication thereof. More particularly this invention relates to adjustable choke valves used primarily for controlling the flow of high pressure liquids such as crude petroleum and the like.

Adjustable choke valves of various types have been widely used throughout the petroleum industry. Such valves are typically placed at or near the well head and are used to adjustably vary the flow of crude petroleum from the well head.

Conventional choke valves usually comprise a pair of cylindrical discs secured within the valve housing. One of the discs is usually fixed with relation to the housing. The other disc is positioned adjacent and abutting the first disc and rotatable with respect thereto in a plane normal to the flow of fluid through the valve. Each of the discs has at least one hole passing transversely through the disc displaced from the center thereof so that upon rotation of one disc the hole therein passes in registry with the hole in the other disc, thereby varying the diameter of the aperture passing through the valve. In this manner the position of the second disc with respect to the first disc may be used to control the flow of fluid through the valve. Obviously when the holes are not aligned the fluid flow through the valve is completely stopped.

In choke valves of the design described, the opposed abutting faces of the discs must be adapted to mate uniformly. Ordinarily the opposed surfaces are ground to a high degree of flatness and polished so that the mating surfaces match and form an effective seal. However in ordinary use, since conventional valves are made of steel and the like, the valve members, particularly the discs, are subject to damage and deterioration from abrasion and corrosion by materials entrained in the fluid stream. For example, sand particles and other abrasive materials are commonly entrained in crude petroleum and cause excessive damage to the polished opposed surfaces of steel discs of the type described. Likewise, crude petroleum may contain large amounts of hydrogen sulfide gas or other corrosive materials which attack and corrode or otherwise deteriorate the valve surfaces. Furthermore, the choke valves of the type described are generally used at the well head to control crude oil under pressures sometimes as high as 10,000 psi. For these reasons, abrasion and corrosion of the valve surfaces rapidly shortens the usable lifetime of the valve and renders it inoperable for the intended use.

In accordance with the present invention an improved choke valve of the general design described above is provided. In the improved valve protective coatings of extremely hard corrosion resistant materials such as titanium carbide or silicon carbide are formed on the opposed abutting surfaces of the valve discs. In one embodiment of the invention the opposing surfaces of the valve discs as described above are covered with a coating of a vapor deposited titanium carbide and polished to form a flat surface. In an alternate embodiment of the invention the opposed discs are of a unique design and are fabricated from a graphite body having a silicon carbide coating formed on the surface thereof to provide an extremely hard and corrosion resistant surface. A particular advantage and feature of the invention is the provision of a choke valve which is both corrosion resistant and sufficiently hard to resist abrasion by abrasive materials contained in crude petroleum streams. Other features and advantages of the invention will become more readily understood from the following detailed description taken in connection with the appended claims and attached drawings.

Figure 1:
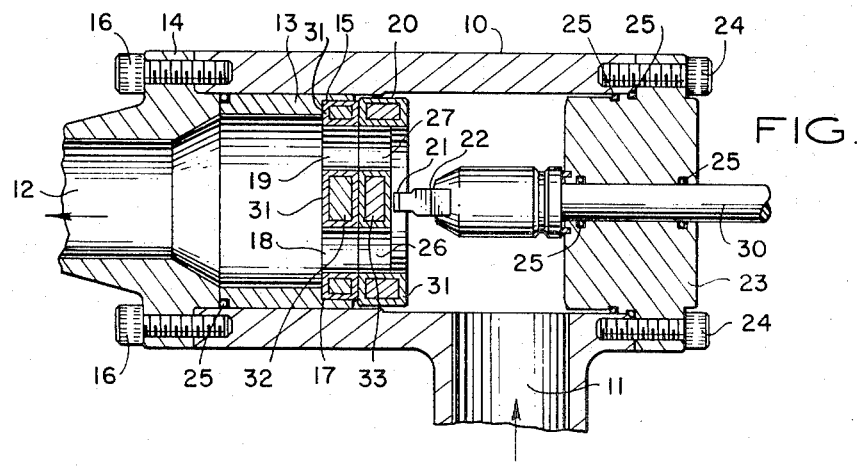
FIG. 1 is a sectional view of a choke valve illustrating one embodiment of the invention.

Referring now to FIG. 1, there is illustrated a choke valve of the general type described. The valve comprises a housing 10 having an inlet 11 and outlet 12. Direction of fluid flow through the valve is indicated by the arrows. A sleeve 13 fits within the exit side of the valve and is supported therein by end piece 14. End piece 14 is secured in place by means of bolts 16. The end of sleeve 13 opposite end piece 14 has an annular shoulder 15 for supporting one of the valve discs.

A first valve disc 17 is fixedly secured to the shoulder 15 in sleeve 13. In the illustration shown disc 17 has a pair of bores 18 and 19 passing therethrough. Bores 18 and 19 are diametrically displaced on opposite sides of the center of the disc 17.

A follower disc 20 is positioned adjacent one face of disc 17, one face thereof mating with the opposed face of disc 17. The opposite face of follower disc 20 has a transverse groove 21 therein which is adapted to mate with a turning fork 22. Turning fork 22 is supported by shaft 30 which is rotatably journaled within end piece 23. End piece 23 is secured to the end of the valve housing 10 by means of bolts 24. Suitable gaskets 25 may be used to effectively seal the valve housing 10 and end pieces 14 and 23.

The follower disc 20 also has a plurality of bores 26 and 27 passing therethrough. Bores 26 and 27 are also diametrically displaced from the center of the follower disc 27 so that upon rotation of follower disc 20 bores 26 and 27 periodically pass in registry with bores 18 and 19 in the first disc 17.

Follower disc 26 is snugly confined within the valve housing 10 and adapted for rotation with respect to first disc 17 by means of turning fork 22. It will be observed, therefore, that fluid passing through the valve enters inlet 11 and passes through the bores 26 and 27 in the follower disc, then through bores 18 and 19 in disc 17, and exits through outlet 12 when bores 18 and 19 are aligned with bores 26 and 27, respectively. However upon rotation of follower disc 20 the bores passing respectively through follower disc 20 and disc 17 become misaligned, thereby constricting the flow. As follower disc 20 is rotated further, the bores become fully misaligned and flow through the valve is completely stopped.

Since the efficiency of the valve described is wholly dependent upon maintaining a fluid-tight seal between the mating opposed surfaces of disc 17 and follower disc 20, it is essential that the mating surfaces be maintained substantially flat and parallel.

While the valve is in the open position (as shown in FIG. 1) the fluid passing through the valve passes directly through the holes 26-18 and 27-19 and thus has little effect on the mating surfaces of the valve. However, when the valve is partially closed the portion of the surface of disc 17 which partially obstructs the holes passing through the discs is exposed to the fluid passing through the discs. Abrasive materials, such as sand particles and the like, contained in a fluid under high pressures have a substantially deteriorating effect on conventional surfaces and cause abrasion thereof. Furthermore, as the valve is closed, abrasive particles may be caught between the mating surfaces causing scratching and scoring of the mating surfaces. Such deterioration of the mating surfaces results in failure of the sealing ability of the valve. After substantial deterioration the valve becomes inoperative for its desired use.

It should also be observed that many fluids contain highly corrosive materials which react with materials conventionally used for choke valves. Obviously, corrosion of the mating surfaces causes irregularities therein and likewise results in leaking and failure of the valve.

In accordance with the principles of this invention, the mating surfaces of disc 17 and follower disc 20 (as shown in FIG. 1) are coated with a dense, impervious, continuous coating 31 of vapor deposited material having a hardness of at least 2,700 on the Knoop scale and polished to a flatness of less than six helium light bands across the surface. In accordance with one embodiment of the invention, the discs 17 and 20 are formed from steel substrates 32 and 33 coated with a titanium carbide layer 31. It has been discovered that steel discs coated with titanium carbide as described hereinbelow may be polished to a high degree of flatness and, when used in the choke valve described with reference to FIG. 1, have a high resistance to both corrosion and abrasion. Therefore, choke valves constructed in accordance with this embodiment of the invention remain effective and useful far longer than conventional valves, even when subjected to highly corrosive and abrasive fluids.

Various methods for producing titanium carbide are known in the art. Typical of such prior art methods is the chemical vapor deposition process disclosed in U.S. Pat. No. 2,962,388 to Wilhelm Rupert et al. In the preparation of vapor deposited coating of titanium carbide on ferrous substrates, however, extreme care must be taken in selection of the substrate surface upon which the titanium carbide is to be formed. For the purposes of this invention, we have discovered that satisfactory titanium carbide coatings can be formed on any hardenable steel containing at least 0.15 percent carbon when such coatings are formed by the process described herein.

In the preferred method for forming discs 17 and 20 of the device shown in FIG. 1, disc blanks are machined from hardenable steel containing at least 0.15 percent carbon. These disc blanks are precision ground to the configuration of the desired disc but are of reduced dimensions. The dimensions of the blanks should be reduced by the thickness of titanium carbide to be deposited thereon.

Figure 4:
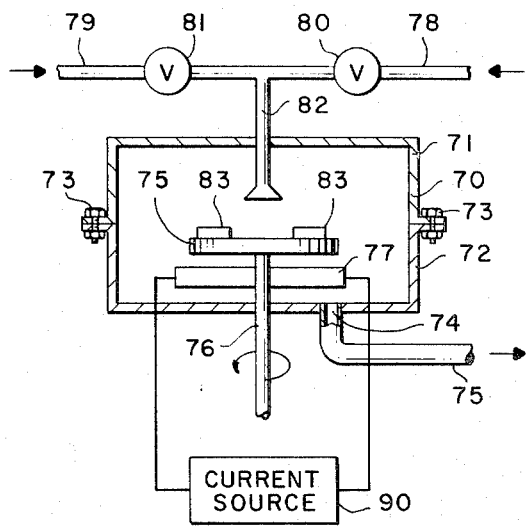
FIG. 4 is a schematic drawing of a process system for producing valve surfaces in accordance with the present invention.

After the steel blanks are machined to the desired configuration and dimensions and thoroughly cleaned they are placed in the apparatus of FIG. 4 as illustrated at 83.

The preferred method of producing the discs in the valve of FIG. 1 is described with reference to the system illustrated in FIG. 4. The apparatus includes a sealable deposition chamber 70 comprised of an upper portion 71 and a lower portion 72. The upper and lower portions are removeably secured together by conventional means such as bolts 73, clamps or the like. Chamber 70 has an exhaust port 74 connected to an exhaust line 75 which is in turn connected to a conventional vacuum pump or the like for removing gases from the deposition chamber.

A rotatable table 85 is mounted on shaft 76 which passes transversely through the bottom of the deposition chamber 70 and is adapted for rotation by conventional means. Rotatable table 75 is preferably constructed of a relatively inert material such as graphite or the like while deposition chamber 70 may be constructed of stainless steel or any other suitable material.

A radiant heater 77 is secured below rotatable table 75 interconnected to a suitable power source 90 for heating the material in the deposition chamber. Reactants are injected into the reaction chamber through in lines 78 and 79 by way of control valves 80 and 81, respectively, and inject the reactants into nozzle 82. Nozzle 82 projects into the upper portion of the deposition chamber and directs the reactants toward the surface of the rotatable table 75 and the steel blanks 83 resting thereon.

Steel blanks 83 are placed on rotatable table 75. After the deposition chamber is closed and sealed, it is evacuated and refilled with dry hydrogen through inlet 79, valve 81 and nozzle 82. When the chamber 70 is filled with dry hydrogen the exhaust port 74 is opened and hydrogen allowed to flow through the chamber 70 at a rate of about 25 to about 50 liters per minute.

With hydrogen flowing through the chamber 70 at essentially atmospheric pressure heater 77 is activated by passing current therethrough from current source 90. The blanks 83 are heated to a temperature between about 900° C and about 1,200° C and maintained at this temperature under flowing hydrogen for about 15 to about 30 minutes to assure complete cleaning and outgassing of the blanks. Throughout the cleaning and the following deposition process, rotatable table 85 is rotated at a rate of about 1–15 rpm. It is thereby uniformly heated by radiant energy from the radiant heater 77 and all blanks 83 are maintained at a relatively constant temperature.

After the steel blanks 83 have been thoroughly cleaned as described above, the flow of hydrogen through the deposition chamber is stopped and hydrogen containing monochlorobenzene substituted therefor. Simultaneously with the introduction of the hydrogen and monochlorobenzene containing gas, a mixture of hydrogen and titanium tetrachloride ($TiCl_4$) introduced through line 78, valve 80 and into nozzle 82.

In the preferred embodiment of the invention, the composition of the reactant entering the deposition chamber 70 through nozzle 82 is approximately 0.75 to about 1.5 mole per cent $TiCl_4$, 0.125 to about 0.25 mole per cent monochlorobenzene and the remainder hydrogen.

It will be understood that within the gas composition ranges given an approximate stoichiometric relationship should be maintained with respect to titanium and carbon in the reactant gas stream. Therefore, it will be apparent that the mole ratio of $TiCl_4$ to $C_6H_5Cl$ should be approximately 6:1. Throughout the deposition process the temperature of the steel blanks 83 is maintained at a temperature between about 900° C and about 1,200° C. Under these conditions a uniform dense coating of titanium carbide (TiC) is formed at a rate of approximately 0.1 to 0.5 mils per hour.

When the desired thickness of titanium carbide is formed on the surfaces of steel blanks 83, the flow of reactants through nozzle 82 is stopped and pure dry hydrogen substituted therefor. The flow of current through radiant heater 77 is then stopped and the blanks 83 allowed to cool to substantially room temperature in flowing hydrogen. The deposition chamber 20 is then flushed with nitrogen and the finished parts removed.

After the titanium carbide coating is formed on the surfaces of steel blanks 83 as described above, the surfaces of the discs are ground to the required dimensions. The opposed surfaces are polished to a surface flatness of about four helium light bands across the surface and parallel to ±0.002 inch.

Titanium carbide coatings formed on steel substrates as described above have been found to be adherently bonded to the steel surface and form a dense, continuous, impervious layer. The surface hardness is about 3,200 on the Knoop scale (using a 100 gram weight) and the density is 4.91 gm/cc. The compressive strength of this coating is about $2-5 \times 10^5$ psi and the material has been found to have essentially zero porosity with a coating thickness of 0.001 inch.

Partially because of the lack of porosity of the TiC formed, coatings from about 0.0004 to about 0.001 inch thick formed on flat parallel surfaces of the steel discs described hereinabove have been found to be suitable for use in the valve described with reference to FIG. 1. Since the coating is harder than most materials normally found in crude petroleum, and since the material is too dense to allow foreign particles to become embedded therein, abrasion of the opposed surfaces of the discs is substantially avoided. Accordingly valves constructed in accordance with this embodiment of the invention have a much longer useable life, even when subjected to fluids carrying highly abrasive particles.

Figure 2:
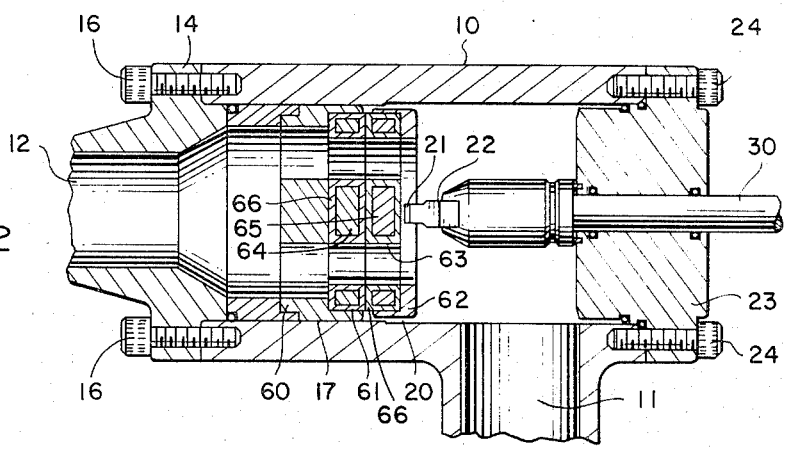
FIG. 2 is a sectional view of a choke valve illustrating another embodiment of the invention.

Referring now to FIG. 1, an alternative embodiment of the invention is shown. The valve illustrated in FIG. 2 is similar in most respects to the valve disclosed in FIG. 1. Accordingly, like numerals are used to indicate like parts throughout the drawings. In the embodiment of FIG. 2 the valve discs are composite structures comprising steel carriers having inserts positioned in the opposed mating faces thereof. Accordingly, as illustrated in FIG. 2 the fixed choke disc 17 comprises a steel carrier plate 60 which has a recess in the top face thereof into which is fitted an insert 61. Likewise, follower disc 20 comprises a steel carrier plate 61 having a recess in one face thereof into which is fitted a follower disc insert 63.

It will be observed in the embodiment illustrated in FIG. 2 inserts 61 and 63 are fitted in recesses in the opposed faces of valve discs 17 and 20 so that contact between the valve discs is limited to the opposed abutting faces of the inserts. It will also be observed that inserts 61 and 63 are also composite bodies comprising substrates 64 and 65 coated with a hard, dense coating 66. In this manner the discs 17 and 20 may possess the strength and rigidity of steel and yet have opposed abutting surfaces comprised of materials which cannot be formed directly on steel substrates.

In producing the inserts 61 and 63 care must be taken to select a substrate upon which a coating having the desired properties can be effectively deposited and will firmly adhere. It has been discovered that silicon carbide coatings having the desired properties can be effectively formed on graphite bodies to form a composite insert body as described hereafter.

Figure 3:
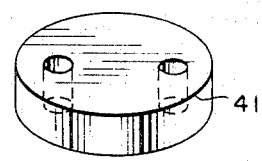
FIG. 3 is a perspective view of the insert disc in the choke valve of FIG. 2.

In order to form adherent silicon carbide coatings on a graphite substrate, the graphite must have a high coefficient of thermal expansion. Accordingly, insert blanks 41 such as illustrated in FIG. 3 are machined to the desired configuration and dimensions from high grade, high expansivity graphite, preferably Speer grade 9,345. This grade of graphite has a coefficient of thermal expansion of $5.0 \times 10^{-6}$ cm/cm and is relatively well matched to the coefficient of thermal expansion of silicon carbide. The graphite blanks are then coated with silicon carbide as is described hereinafter with reference to FIG. 4.

Graphite blanks 41 (referred to in FIG. 4 as 83) are placed on rotating table 75, and the deposition chamber sealed.

The chamber is then evacuated and refilled with dry hydrogen through line 79, valve 81 and nozzle 82. Exhaust port 74 is then opened and dry hydrogen allowed to pass through the deposition chamber 70 at a rate of 50 to about 150 liters per minute.

With hydrogen flowing through the chamber 70 at essentially atmospheric pressure heater 77 is activated by passing current therethrough from current source 90. The graphite blanks 83 are heated to a temperature of between about 1,000° C and 1,400°C and maintained at this temperature for about 10 to about 15 minutes with dry hydrogen flowing through the deposition chamber to assure complete cleaning and outgassing of the graphite blank. Throughout the cleaning and following deposition process rotatable table 85 is rotated at the rate of about 1–15 rpm. It is thereby uniformly heated by radiant energy from the radiant heater 77 and all blanks 83 are maintained at a relatively constant temperature.

After the graphite blanks 83 have been thoroughly cleaned as described above, the flow of hydrogen in the deposition chamber is stopped and hydrogen containing silicon tetrachloride ($SiCl_4$) substituted therefor. Simultaneously with the introduction of hydrogen and silicon tetrachloride containing gas, mixture of hydrogen and toluene is introduced through line 78, valve 80 and into nozzle 82.

In the preferred practice of the invention, the composition of the reactant gas entering chamber 70 through nozzle 82 is approximately 2–10 mole percent silicon tetrachloride, 0.3 to about 1.5 mole percent toluene and the remainder hydrogen. It will be understood that within the gas composition ranges given an approximate stoichiometric relationship should be maintained with respect to silicon and carbon in the reactant gas stream. Therefore, it will be apparent that the mole ratio of $SiCl_4$ to $C_6H_5CH_3$ should be approximately 7:1. Throughout the deposition process the temperature of the graphite blanks is maintained at a constant temperature between about 1,000° C and about 1,400°C. Under these conditions a uniform dense coating of silicon carbide is formed on the surface of the graphite blanks at rates up to 40 mils per hour.

When the desired thickness of silicon carbide is formed on the surface of the graphite blanks 83 the flow of reactants through nozzle 82 is stopped and pure dry hydrogen substituted therefor. The flow of current through radiant heater 77 is then stopped and the blanks allowed to cool to substantially room temperature in flowing hydrogen. The deposition chamber 70 is then flushed with nitrogen and the finished product is removed.

After the silicon carbide coating is formed on the surfaces of the graphite blanks as described above, the surfaces of the discs are ground to the required dimensions. The opposed surfaces are then polished to a surface flatness of about four helium light bands across the surface. These inserts are then secured within the depressions in steel carriers 60 and 62 with a suitable adhesive or by other conventional means. A suitable adhesive for securing the inserts within the steel carriers has been found to be adhesive epoxy cement manufactured by the Armstrong Company, Warsaw, Ind., marketed under the trade name Armstrong A-2 Adhesive. Steel carriers 60 and 62 having inserts 61 and 63 secured therein as described above may then be placed in the valve housing 10 as illustrated in FIG. 2.

Vapor deposited silicon carbide coatings produced as described above have been found to have a density of 3.22 grams per cubic centimeter and a surface hardness of 2,740 on the Knoop scale (using a 100 gram weight). The material is also found to have an excellent resistance to oxidation up to temperatures as high as 1,500°C. This material also has been found to have a compressive strength of about $119 \times 10^3$ psi and essentially zero porosity with a coating thickness of at least 0.005 inches. Accordingly, due to the above listed characteristics, valve discs fabricated in accordance with this invention are essentially resistant to attack by any corrosive material contained in fluid streams such as crude petroleum and the like. Furthermore, because of the extreme surface hardness of the material, abrasive materials contained in a fluid stream passing through the choke valve have little effect on the silicon carbide surfaces of the valve.

Graphite bodies coated with silicon carbide 0.005 inch thick polished to a surface flatness of four helium light bands across the surface and mounted in steel carriers as described above may be effectively used as the choke discs 17 and 20 shown in FIG. 2. The opposed abutting surfaces of SiC should be parallel to ±0.002 inch. In this structure the opposed mating surfaces, which are harder than most substances found in crude petroleum, are highly resistant to abrasive damage.

If desired a third embodiment of the invention may be produced by first coating the steel carrier discs 60 and 62 with titanium carbide as described hereinabove prior to securing the silicon carbide coated graphite inserts 61 and 63 therein. In this embodiment of the invention the steel carrier discs are protected from corrosive or abrasive action of fluids passing through the valve by the titanium carbide coating while the mating surfaces of the valve discs are protected by the silicon carbide coating as described hereinabove. Likewise, other portions of the valve, such as the steel collar 13 may be coated with titanium carbide to effectively protect the portions of the valve which are most susceptible to corrosion and abrasion by fluids passing therethrough, thereby producing a valve in which all portions subject to deterioration by either corrosion or abrasion are effectively protected by extremely hard, impermeably dense coatings which lengthen the useable life of the valve.

While the invention has been described with particular reference to specific embodiments thereof, it is to understood that the forms of the invention shown and described in detail are to be taken as preferred embodiments of same, and that various changes and modifications may be resorted to without departing from the spirit and scope of the invention as defined by the appended claims.

What is claimed is:

1. A choke valve comprising:
   a. a housing having an inlet and an outlet,
   b. a first disc fixedly mounted within said housing between said inlet and said outlet and having an aperture therein,
   c. a second disc rotatable mounted within said housing, one face of said first disc contacting and mating with one face of said second disc, said second disc having an aperture therein which periodically passes in registry with said aperture in said first disc when said second disc is rotated,
   d. a coating of dense, impermeable material having a hardness of at least 2,700 on the Knoop scale and having a variation in surface flatness of less than six helium light bands covering the mating surfaces of said first and second discs, said discs being comprised of:
   e. steel carrier plates having recesses in said mating surfaces, and
   f. insert members secured within said carrier plates, said insert members comprising bodies of graphite having a coating of silicon carbide on the exposed surface thereof.

2. A choke valve as defined in claim 1 wherein the exposed surfaces of said carrier plates are covered with a dense impermeable coating of titanium carbide.

3. In an adjustable choke valve having a housing with an inlet and an outlet, a choke disc having at least one aperture therein positioned between said inlet and said outlet, a follower disc abutting said choke disc and rotatable with respect thereto, said follower disc also having at least one aperture passing therethrough and positioned to periodically pass in registry with said aperture in said choke disc as said follower disc is rotated, and means for rotating said follower disc, the improvement comprising:
   a. a choke disc and a follower disc having depressions in the abutting surfaces thereof;
   b. bodies secured within said depressions in said choke disc and said follower disc, said bodies having a coating of dense, impermeable material having a thickness of at least 0.005 inch and a hardness of about 2,740 on the Knoop scale covering the mating surfaces of said bodies, said mating surfaces further being parallel to ±0.002 inch and having a variation in surface flatness of less than six helium light bands; and c. said bodies being comprised of graphite coated with a continuous layer of silicon carbide intimately bonded to said graphite.

* * * * *